United States Patent
Ramanathan et al.

(10) Patent No.: US 12,008,814 B2
(45) Date of Patent: Jun. 11, 2024

(54) ADJUSTING AREAS OF INTEREST FOR MOTION DETECTION IN CAMERA SCENES

(71) Applicant: ObjectVideo Labs, LLC, Tysons, VA (US)

(72) Inventors: Narayanan Ramanathan, Chantilly, VA (US); Gang Qian, McLean, VA (US); Eduardo Romera Carmena, Madrid (ES); Donald Gerard Madden, Columbia, MD (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 37 days.

(21) Appl. No.: 17/739,237

(22) Filed: May 9, 2022

(65) Prior Publication Data

US 2022/0366696 A1 Nov. 17, 2022

Related U.S. Application Data

(60) Provisional application No. 63/187,055, filed on May 11, 2021.

(51) Int. Cl.
*H04N 7/18* (2006.01)
*G06T 7/20* (2017.01)
(Continued)

(52) U.S. Cl.
CPC .............. *G06V 20/52* (2022.01); *G06T 7/20* (2013.01); *G08B 13/19602* (2013.01);
(Continued)

(58) Field of Classification Search
CPC ....... G06T 2207/20132; G06T 2210/22; G06T 5/006; G06T 5/50; G06T 7/00–001;
(Continued)

(56) References Cited

U.S. PATENT DOCUMENTS 9,497,425 B2 11/2016 Hu
2005/0157169 A1 7/2005 Brodsky et al.
(Continued)

OTHER PUBLICATIONS

Hirzallah, "Automated Camera Monitoring System for Selective Areas of Interest," Journal of Computer Science, 2007, 3(2): 62-66, Retrieved on Jul. 14, 2022. Retrieved from <URL:https://www.researchgate.net/profile/Nael-Hirzallah/publication/26449053_Automated_Camera_Monitoring_System_for_Selective_Areas_of_Interest/links/02e7e5251a 6e920416000000/Automated-Camera-Monitoring-System-for-Selective-Areas-of-Interest.pdf>.
(Continued)

*Primary Examiner* — John W Miller
*Assistant Examiner* — Humam M Satti
(74) *Attorney, Agent, or Firm* — Fish & Richardson P.C.

(57) ABSTRACT

Disclosed are methods, systems, and apparatus for adjusting areas of interest for motion detection in camera scenes. A method includes obtaining a map of false motion event detections using a first area of interest; identifying an overlap area between the map of false detections and the first area of interest; determining a second area of interest that includes portions of the first area of interest and excludes at least a part of the overlap area; obtaining a map of true motion event detections using the first area of interest; determining whether true detections using the second area of interest compared to true detections using the first area of interest satisfies performance criteria; and in response to determining that true detections using the second area of interest compared to true detections using the first area of interest satisfies performance criteria, providing the second area of interest for use in detecting events.

20 Claims, 3 Drawing Sheets

(51) Int. Cl.
*G06V 20/52* (2022.01)
*G08B 13/196* (2006.01)

(52) U.S. Cl.
CPC ... *H04N 7/188* (2013.01); *G06T 2207/10016* (2013.01); *G06T 2207/30232* (2013.01)

(58) Field of Classification Search
CPC . G06T 7/11; G06T 7/136; G06T 7/174; G06T 7/20; G06T 7/215–254; G06T 7/292; G06T 7/30–344; G06T 7/38; G06T 7/60–68; G06T 7/70–75; G06T 2207/10016; G06T 2207/30196; G06T 2207/20104; G06T 2207/30232; G06T 2211/412; G06T 2207/20081; G06T 7/246; G08B 13/196–19697; H04N 21/44008; H04N 7/18–188; G06V 20/40; G06V 20/44; G06V 20/46; G06V 20/48; G06V 20/49; G06V 20/60; G06V 20/653; G06V 20/52; G06V 10/26
See application file for complete search history.

(56) References Cited

U.S. PATENT DOCUMENTS

| | | |
|---|---|---|
| 2006/0215030 A1 | 9/2006 | Shih et al. |
| 2012/0287035 A1* | 11/2012 | Valko .................. G06F 1/3231 |
| | | 713/323 |
| 2016/0026890 A1 | 1/2016 | Gupta et al. |
| 2016/0042621 A1* | 2/2016 | Hogg .................... H04N 23/64 |
| | | 348/155 |
| 2019/0130582 A1* | 5/2019 | Cheng ..................... G06T 7/11 |
| 2019/0327409 A1 | 10/2019 | Holz |
| 2019/0335101 A1* | 10/2019 | Gee ......................... G06T 9/00 |
| 2022/0164579 A1* | 5/2022 | Hsu .................. G08B 13/19606 |
| 2022/0335816 A1* | 10/2022 | Dice ..................... G08B 21/18 |

OTHER PUBLICATIONS

PCT International Search Report and Written Opinion in International Appln. No. PCT/US2022/072195, dated Aug. 3, 2022, 7 pages.

* cited by examiner

ADJUSTING AREAS OF INTEREST FOR MOTION DETECTION IN CAMERA SCENES

CROSS-REFERENCE TO RELATED APPLICATIONS

This application claims the benefit of the U.S. Provisional Patent Application No. 63/187,055 filed May 11, 2021, which is incorporated herein by reference in its entirety.

TECHNICAL FIELD

This disclosure application relates generally to surveillance cameras.

BACKGROUND

Many properties are equipped with monitoring systems that include sensors and connected system components. Some property monitoring systems include cameras.

SUMMARY

Techniques are described for adjusting areas of interest for motion detection in camera scenes. In some video surveillance systems, a user can define a portion of the scene that the surveillance system should monitor for activities, which may be referred to as an Area of Interest (AOI). The AOI can be defined such that the AOI covers the regions the user expects activity pertaining to the user's interest to take place. The regions can include, for examples, a driveway, walkway, or yard. The surveillance system can ignore regions that are outside of the AOI. The regions outside of the AOI are regions that might not be of interest to the user, such as a neighbor's driveway, a forest, or a street.

The user may be, for example, a resident of a property where the camera is installed. The resident may primarily be concerned with camera motion events that indicate activities of objects of interest, such people at the property. For example, the resident may be interested in receiving alerts and notifications related to events that include people approaching the property, people delivering packages to the property, etc. When the camera detects motion of an object of interest, e.g., a person, animal, or vehicle, the detection can be referred to as a true motion event. A true motion event can be considered an event that is determined to have a high confidence of corresponding to an object of interest detected in the scene.

In contrast, the resident may be less concerned with other motion events that may be captured by the camera, such as moving foliage, flags, wind chimes, and birds. When the camera detects motion of an object that is not of interest, the detection can be referred to as a false motion event. An object that is not of interest can be referred to as an object of non-interest.

True motion events often take place in particular regions of a camera scene e.g., on a yard, driveway, street, sidewalk, or floor. For example, a person approaching the property may be walking in a yard, riding a scooter on a sidewalk, or riding a bicycle in a street. These regions can be included in the user-defined AOI. Therefore, in accordance with the resident's programmed preferences and settings, motion events that occur in an AOI may cause the camera to perform an action such as generating a notification for the resident. In contrast, motion events that occur outside of the AOI may result in no action being performed by the camera.

While such a definition of AOI is expected to let the video surveillance system focus only on the interesting portions of the scene, there may be unexpected event detections that arise as a result of the AOI including objects of non-interest. A surveillance camera can use an AOI adjuster to automatically adjust and refine the user-defined AOI in order to mitigate false motion events caused by motion of objects of non-interest. The AOI adjuster preserves detection rates for true motion events.

In an example, a camera can be installed overlooking a scene that includes a driveway. Trees may be located near the driveway. Over time, the trees may grow so that tree branches protrude into the driveway. The growing tree branches protruding into the driveway could affect event detection. For example, the tree branches can wave on windy days, causing false motion events.

In some implementations, movement detected by the camera can trigger the camera, a monitoring system, or both, to perform one or more actions. A camera can detect motion events and generate alerts to send to a resident of a property based on the detected motion events. In some examples, the monitoring system may activate additional sensors in response to detecting the motion event. For example, movements that meet pre-programmed criteria may trigger the monitoring system to send a notification to a resident of the property or to adjust a setting of the monitoring system. Example criteria can include an object approaching the property within a certain range or at a certain speed, or an object passing by or approaching the property late at night.

It is desirable for the resident to receive alerts that are of interest to the resident, and to reduce the number of false alerts, or non-interest alerts, sent to the resident. Additionally, it is desirable to reduce unnecessary computation performed by the camera. For example, when a motion event occurs, the camera performs motion event analysis. Performing motion event analysis on false motion events can cause unnecessary computation to be run on the camera hardware.

To reduce false alerts and unnecessary computation, an AOI adjuster can use an algorithm to automatically detect objects within the AOI that are causing false motion events to be detected. To differentiate true motion events from false motion events, the AOI adjuster of the camera can analyze each motion event that was detected by the system over a period of time, and can classify each motion event as either a true motion event or a false motion event. A true motion event can be, for example, a detection of motion of an object of interest such as a person, animal, or vehicle. A false motion event can be, for example, a detection of motion of an object of non-interest, such as a flag or a tree branch.

To distinguish true motion events from false motion events, for every event for which the system generated an event alert, the AOI adjuster can compute a traversal score. If the AOI adjuster determines that the camera has generated events that have low traversal scores, then the AOI adjuster can investigate if the initial AOI overlaps with scene entities that caused the false motion events. Hence, traversal scores generated for events can act as an indicator as to whether the AOI should be adjusted. The AOI adjuster can then adapt the AOI to generate an adjusted AOI.

In general, innovative aspects include a method including actions of obtaining a map of false motion event detections using a first area of interest of a scene within a field of view of a camera; identifying an overlap area between the map of false motion event detections and the first area of interest; determining a second area of interest that includes one or more portions of the first area of interest and excludes at least a part of the overlap area between the map of false motion event detections and the first area of interest; obtaining a map of true motion event detections using the first area of interest; determining whether true motion event detections using the second area of interest compared to true motion event detections using the first area of interest satisfies performance criteria; and in response to determining that true motion event detections using the second area of interest compared to true motion event detections using the first area of interest satisfies the performance criteria, providing the second area of interest for use in detecting events.

Other embodiments of this and other aspects include corresponding systems, apparatus, and computer programs, configured to perform actions of the methods encoded on computer storage devices. A system of one or more computers or other processing devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. In some implementations, the actions include generating the map of false motion event detections and the map of true motion event detections by: obtaining data defining the first area of interest; obtaining images captured by the camera; detecting a plurality of motion events in the images captured by the camera, each motion event representing motion of an object within the field of view of the camera; and classifying each motion event as a false motion event detection or a true motion event detection.

In some implementations, the actions include determining a traversal score for each motion event. The traversal score indicates an extent of motion of the object across the field of view of the camera. Classifying each motion event as a true motion event detection or a false motion event detection uses the traversal score.

In some implementations, determining a traversal score comprises, for each motion event representing motion of an object: determining a centroid location of the object in each frame of a frame set, the frame set including multiple sequential image frames in which the object was detected during the motion event; determining a traversal metric using a distance between the centroid location in a first frame of the frame set and the centroid location in a final frame of the frame set; and determining, for each motion event, a corresponding traversal score by combining traversal metrics for a plurality of frame sets, each frame set including multiple sequential image frames in which the object was detected during the motion event.

In some implementations, the map of false motion event detections includes an outline encompassing pixels that correspond to locations of the scene where false motion event detections occurred.

In some implementations, the map of true motion event detections includes an outline encompassing pixels that correspond to locations of the scene where true motion event detections occurred.

In some implementations, the actions include generating the map of true motion event detections by: generating a plurality of bounding boxes. Each bounding box includes at least an upper boundary and a lower boundary and encloses a location of the scene where a true motion event detection occurred; and generating the outline. The outline encompasses a portion of each bounding box that includes the lower boundary of the bounding box.

In some implementations, determining the second area of interest includes: labeling segments of the scene according to objects represented by the segments; generating a copy of the first area of interest; and adjusting the copy of the first area of interest based on the labels of the segments of the scene to obtain the second area of interest.

In some implementations, adjusting the copy of the first area of interest based on the labels of the segments of the scene includes: determining a label for a particular segment of the scene within the overlap area between the map of false motion event detections and the first area of interest; classifying the label of the particular segment as corresponding to an object that is not of interest; and based on classifying the label of the particular segment as corresponding to an object that is not of interest, removing the particular segment from the copy of the first area of interest.

In some implementations, adjusting the copy of the first area of interest using the labels of the segments of the scene includes: determining a label for a particular segment of the scene within the overlap area between the map of false motion event detections and the first area of interest; classifying the label of the particular segment as corresponding to an object that is of interest; and based on classifying the label of the particular segment as corresponding to an object that is of interest, maintaining the particular segment within the first area of interest.

In some implementations, determining whether true motion event detections using the second area of interest compared to true motion event detections using the first area of interest satisfies performance criteria include determining an impact of using the second area of interest on at least one of: a recall of the camera; a detection latency of the camera; or a degree of overlap between the respective area of interest and the map of true motion event detections.

In some implementations, the performance criteria include a maximum threshold impact on a recall of the camera, the recall of the camera using a ratio of a number of true motion event detections to a total number of true objects of interest depicted in images captured by the camera during a duration of time.

In some implementations, the performance criteria include a maximum threshold impact on a true motion overlap score of the camera, the true motion overlap score using a degree of overlap between a map of true motion event detections and a respective area of interest.

In some implementations, the performance criteria include a maximum threshold impact on detection latency of the camera, the detection latency using a time delay between a time when an event occurs and a time when the camera detects the event.

In some implementations, determining the second area of interest includes removing, from a copy of the first area of interest, a region of the scene corresponding to the overlap area.

In some implementations, the actions include: detecting a decrease in performance of the camera while detecting events using the second area of interest; and in response to detecting the decrease in performance of the camera, providing the first area of interest for use in detecting events.

In some implementations, detecting the decrease in performance includes determining that an average rate of false motion event detections that occur while detecting events using the second area of interest is greater than an average rate of false motion event detections that occur while detecting events using the first area of interest.

In some implementations, providing the second area of interest for use in detecting events includes: storing the second area of interest in memory; and detecting events using the stored second area of interest.

As a result of the adjustment, the sources of false motion may mostly fall outside the adjusted AOI. The adjustment is configured to improve the accuracy of detection of events that interest the user. Thus, the disclosed techniques adapt the AOI to maintain high precision as camera scenes change over time. Adapting the AOI can help to improve performance and reduce false alerts while not requiring additional computations to be performed when detecting motion events.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
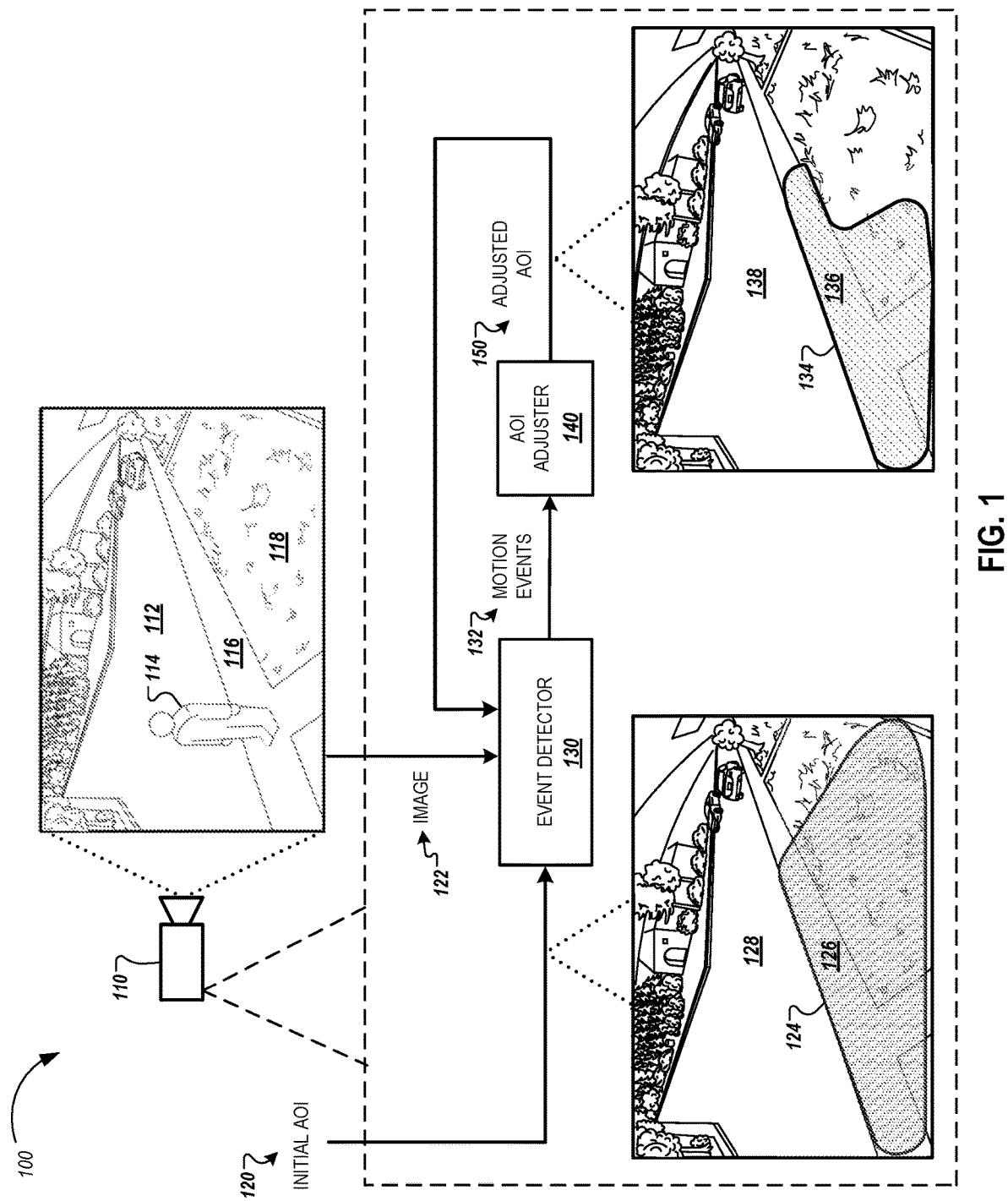
FIG. 1 illustrates an example camera including a system for adjusting areas of interest for motion detection in camera scenes using a camera.

FIG. 1 illustrates an example system 100 for adjusting areas of interest for motion detection in camera scenes using a camera. The system 100 includes a camera 110. In some implementations, the camera 110 may be installed at a property such as a home, another residence, a place of business, a public space, or another facility that has one or more cameras 110 installed. The camera 110 can be a component of a monitoring system that monitors the property.

In some implementations, the camera can be a component of a doorbell that is installed external to the property. In some implementations, the camera 110 can be separate from a doorbell. For example, the camera 110 may be installed a few inches from a doorbell, e.g., near a door of a property. In some examples, the camera 110 is a component of a monitoring system that collects data from various sensors in order to monitor conditions and events at the property.

The camera 110 obtains visual images of a scene at the property. In some examples, the camera 110 captures video images from a scene within a field of view of the camera 110. The field of view is an area that is observable by the camera 110. The camera 110 has a field of view that includes a scene that includes a yard 118, a walkway 116, and a road 112.

Video images include multiple consecutive camera images, or frames. The video captured by the camera 110 can include any type of images. For example, the video can include visual light images, infrared images, or radio wave images. In some examples, the video can include a combination of one or more types of images, e.g., visual light images with infrared illumination.

In some examples, the camera 110 can capture video continuously. In some examples, the camera 110 can capture video when triggered by an event. For example, the camera 110 may capture video when triggered by depression of the button on a doorbell. In some examples, the camera 110 may capture video when triggered by activation of the motion sensor or other sensor of a doorbell.

The camera 110 may capture video for a preprogrammed amount of time. For example, when triggered by depression of the button on a doorbell, the camera 110 may capture video for a preprogrammed time of 10 seconds, 30 seconds, or 60 seconds. When triggered by a motion sensor, the camera 110 may capture video for a preprogrammed time and/or may capture video until the motion sensor no longer detects motion.

In some examples, the camera 110 can include a pre-event buffer and a post-event buffer. The camera 110 can save video images captured over a preprogrammed amount of time in the pre-event buffer. For example, the camera 110 can save the most recent 5 seconds, 10 seconds, or 15 seconds of video in the pre-event buffer. The camera 110 may continually update the video stored in the pre-event buffer. When triggered by an event, the camera 110 can save subsequent video images in the post-event buffer. The video stored in the pre-event buffer and the post-event buffer can be provided to a user, e.g., as part of a notification of the event, in order to provide context for the event.

The camera 110 can perform video analysis on captured video. Video analysis can include detecting, identifying, and tracking objects in the video. The camera 110 may include an object detector that can detect the presence of objects within a frame, and a motion detector that can detect motion patterns of objects of interest. The object detector can be, for example, a pretrained object detector that detects objects, classifies objects, or both. When the object detector detects an object, the object detector can identify a bounding box around the image of the object in the frame. The camera 110 may include an object tracker that can track object movement from one frame to a consecutive frame. The object tracker can track the bounding boxes of existing objects in each subsequent frame. A positive object detection combined with positive motion detection can be classified as a motion event.

In some implementations, the camera 110 communicates electronically with a remote server. For example, the camera 110 may communicate with a remote server through a control unit at the property. In some examples, the camera 110 can send data, e.g., camera images, directly to a server. To support communications with a server, the camera 110 may include communications modules, such as a modem, transceiver, modulator, or other hardware or software configured to enable the device to communicate electronic data through a network.

In some implementations, a resident of the property, or another user, communicates with the camera 110, a server, or both, through a network connection. In some implementations, the resident or other user communicates with the camera 110 through a software ("smart home") application installed on a mobile device.

A server can be, for example, one or more computer systems, server systems, or other computing devices. In some implementations, a server is a cloud computing platform. The camera 110 may communicate with a server via a long-range data link. The long-range data link can include any combination of wired and wireless data networks. For example, the camera 110 may exchange information with a server through a wide-area-network (WAN), a cellular telephony network, a cable connection, a digital subscriber line (DSL), a satellite connection, or other electronic means for data transmission. The camera 110 and a server may exchange information using any one or more of various communication synchronous or asynchronous protocols, including the 802.11 family of protocols, GSM, 3G, 4G, 5G, LTE, CDMA-based data exchange or other techniques.

The camera 110 includes an event detector 130 and an AOI adjuster 140. The camera 110 receives an initial AOI 120. The initial AOI 120 can be input by a user. For example, a user can input the initial AOI 120 to a user interface presented on a display, e.g., a display of a control unit of a monitoring system or a display of a mobile device associated with the user. The user can input the initial AOI 120, for example, by drawing an outline of the AOI in a graphical user interface shown on the display of the control unit or of the mobile device. The outline can be, for example, a polygon or non-polygon shape.

The initial AOI can be an area of the camera scene that a user wants the camera to detect motion. For example, the user may want to receive notifications about objects of interest detected in a driveway or walkway of the camera scene. The user can input the driveway by drawing an outline of the walkway. In some cases, the user may input a larger AOI than is necessary to detect objects of interest. For example, if the user selects an entire yard as the AOI, then false alerts could occur due to bushes and trees being included in the AOI.

The initial AOI 120 can be a binary segmentation AOI. For example, pixels within the AOI can be labeled as AOI pixels, while pixels outside of the AOI can be labeled as non-AOI pixels. The outline 124 of the initial AOI 120 shown in FIG. 1 marks a demarcation between AOI pixels 126, inside the outline 124, and non-AOI pixels 128, outside of the outline 124.

In the initial AOI 120, the AOI-labeled pixels can be shaded white, while the non-AOI labeled pixels can be shaded black. The camera 110, e.g., the event detector 130, can use the initial AOI 120 as a mask to detect events related to the AOI-labeled pixels. The camera 110 using the AOI 120 might not detect events related to the non-AOI labeled pixels, e.g., when those events only occur in the non-AOI labeled pixels. The AOI-labeled pixels include portions of the initial AOI 120 that correspond to the yard 118 and the walkway 116 of the camera image 122. The non-AOI labeled pixels include portions of the initial AOI 120 that correspond to the sky, other properties, and the road 112.

The camera 110 captures a video clip including camera image 122. The camera image 122 shows a person 114 walking on a walkway 116. The camera 110 may capture the video clip including the camera image 122, for example, upon being triggered by a motion sensor, video-based motion detector, or object detector that detects the motion of the person 114. The camera 110 may also capture the video clip including the camera image 122, for example, as part of a constant capturing of frames, or upon a doorbell button being pressed.

A video clip can include video captured during of a length of time, e.g., a length of time from about two seconds to about ten seconds. A video clip can include a number of consecutive captured image frames, e.g., from about sixty image frames to about three hundred image frames. In some examples, a video clip can include a number of consecutive captured image frames based on the beginning and end of a detected event. For example, a video clip can include a first image frame in which the person 114 was detected, the last image frame in which the person 114 was detected, and the consecutive image frames between the first image frame and the last image frame in which the person 114 was detected.

In some implementations, the camera 110 may select a number of video clips for analysis by the AOI adjuster 140. For example, the camera 110 can select a number of video clips, e.g., five, ten, or fifteen video clips, in which a motion event was detected. In some examples, the camera 110 selects a number of video clips captured during a time period, e.g., an hour, a day, or a week.

The camera 110 can select the video clips based on pre-programmed criteria. Criteria can include, for example, illumination level of the video clips, presence of moving objects in the video clips, and stillness of the camera 110. In some implementations, the camera 110 may select video clips that include a single detected event. A single detected event can be an event in which only one object was detected per image frame over the course of the event.

In some examples, the camera 110 may select video clips to analyze to at pre-programmed intervals, e.g., once per day, or once per week. In some examples, the camera 110 may select video clips to analyze in response to an event. For example, the camera 110 may select to analyze video clips for AOI adjustment in response to a repositioning of the camera 110, or in response to the camera 110 detecting a new object within the field of view, e.g., a new tree planted in a yard.

The event detector 130 detects object motion in the camera scene. The camera 110 can run a pre-trained object detector on camera images captured during a time period. The object detector can identify objects in the camera images and can generate a bounding box around each object. Each bounding box can include at least an upper boundary and a lower boundary. Each boundary box encloses a location of the scene where an object was detected. The bounding box can be an area of the camera image where the object is positioned, and can coarsely outline the object using, for example, a rectangular shape. Once the camera 110 has generated the bounding boxes around the objects, the camera 110 can track movement of the objects by tracking movement of the bounding boxes.

The event detector 130 outputs motion events 132. A motion event 132 can be an event that includes object motion detected in an AOI of the camera scene. In some examples, a motion event 132 can be any object motion that caused a notification or alert to be generated. In some examples, a motion event 132 can be any object motion that triggered further computational processing by the camera 110. For example, the camera 110 may detect motion in an AOI, and in response to detecting motion, perform object classification. The object motion that caused the camera to perform object classification can be considered a motion event 132.

In some implementations, the camera selects, for analysis, motion events 132 that include single object events. A single object event is an event in which only one identified object was part of the event reported to the user. For example, an event that includes only the person 114 can be classified as a single object event. In contrast, an event that includes the person 114 and a vehicle driving on the road 112 would not be classified as a single object event. The event that includes the person 114 and the vehicle might therefore not be selected for analysis in refining the AOI.

The AOI adjuster 140 receives the motion events 132. The AOI adjuster 140 adjusts the AOI based on the motion events 132. The AOI adjuster 140 can generate the adjusted AOI 150 by refining the initial AOI 120. In some examples, the AOI adjuster 140 generates a copy of the initial AOI 120 and generates an adjusted AOI 150 by refining the copy of the initial AOI 120. The AOI adjuster 140 can refine the copy of the initial AOI 120, e.g., by removing parts of the copy of the initial AOI 120. The outline 134 of the AOI 150 shown in FIG. 1 marks a demarcation between adjusted AOI pixels 136, inside the outline 134, and adjusted non-AOI pixels 138, outside of the outline 134.

Though described above as being performed by a particular component of the system 100 (e.g., the camera 110), any of the various control, processing, and analysis operations can be performed by either the camera 110, a monitoring server, or another computer system of the system 100. For example, the system 100 may include a control unit at the property. The control unit may be configured to monitor and control various sensors and devices at the property. The control unit may communicate with the camera 110 and other sensors over a wireless network at the property. The control unit, a monitoring server, the camera 110, and/or another computer system can determine the AOI, detect motion events, determine motion event intersection with the AOI, etc. For example, a system may not include a monitoring server and the control unit may perform all the functions described for a monitoring server. In another example, the camera 110 may determine the AOI from images instead of receiving an AOI determined by a server. In yet another example, a server may determine the AOI and the control unit may determine motion event intersection with the AOI instead of the camera 110.

Figure 2:
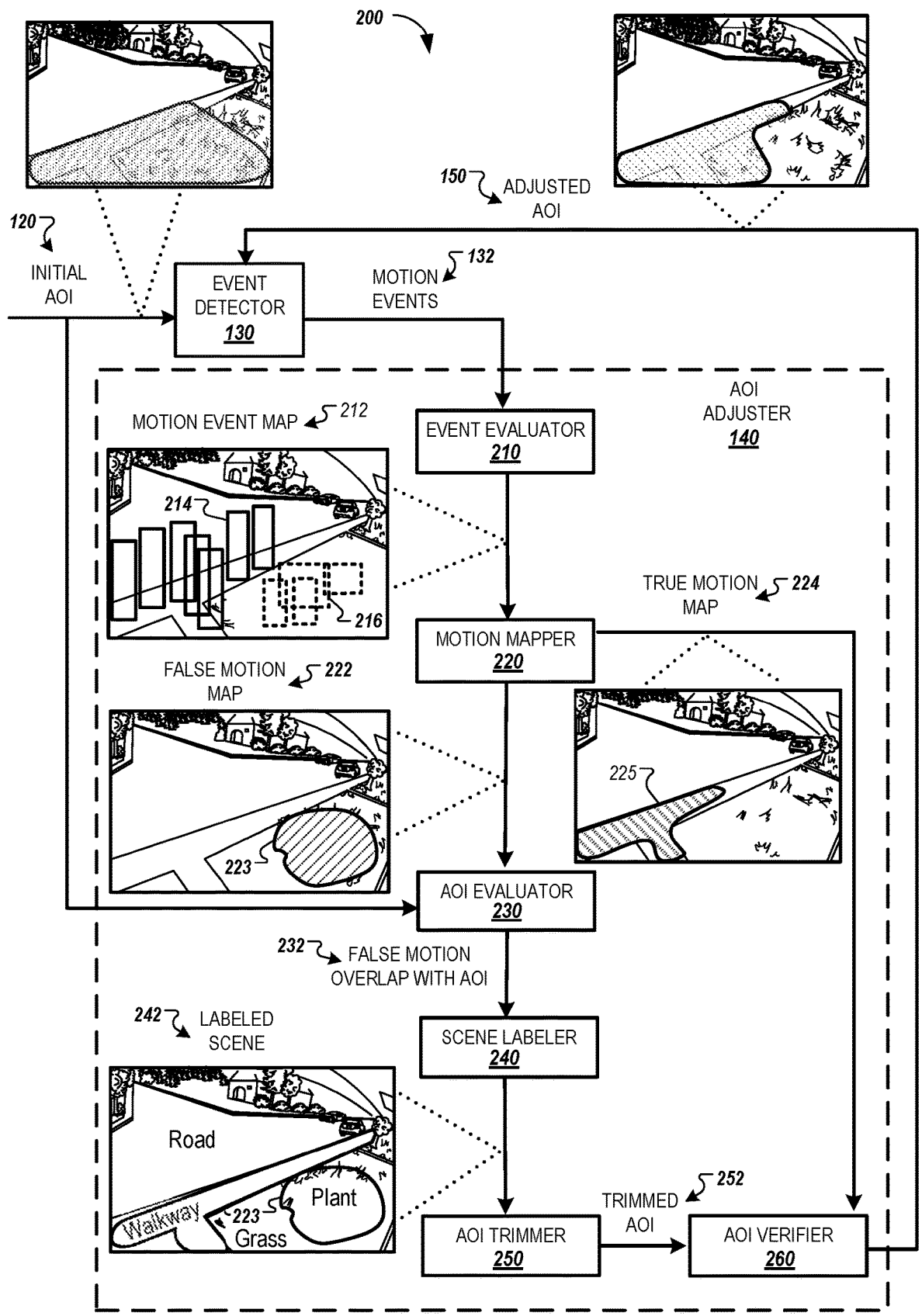
FIG. 2 illustrates an example system for adjusting areas of interest for motion detection in camera scenes using a camera.

FIG. 2 illustrates an example system 200 for adjusting areas of interest for motion detection in camera scenes. The system 200 includes the event detector 130 and the AOI adjuster 149. The AOI adjuster 140 includes an event evaluator 210, a motion mapper 220, an AOI evaluator, a scene labeler 240, an AOI trimmer, and an AOI verifier 260.

The event detector 130 outputs motion events 132 to the AOI adjuster 140. The event evaluator 210 evaluates the motion events 132. Motion events 132 can be events in which a motion of an object is detected within a field of view of a camera. In some examples, motion events 132 can be events that are reported to a user.

For each motion event 132, the event evaluator classifies the event as either a true motion event or a false motion event. A true motion event can be considered an event that is determined to have a high confidence of corresponding to an object of interest detected in the scene. A false motion event can be considered an event that is determined to have a low confidence of corresponding to an object of interest, a high confidence of corresponding to an object of non-interest, or both.

The event evaluator 210 can differentiate true motion events from false motion events using one or more metrics. An example metric is a traversal score. The traversal score indicates an extent of motion of the object across the field of view of the camera. Traversal scoring can be used as an approach to determine if a detected object is associated with a motion trajectory across the camera scene. The traversal score is a time-based metric. Traversal scores can be computed over time-intervals of, for example, about two seconds to about five seconds. Traversal scores can be used to differentiate true object motion events from false object motion events.

In some implementations, the event evaluator 210 determines a traversal score for each motion event 132, and based on the traversal score, classifies the motion event 132 as either a true motion event or a false motion event.

A true motion event can be a detection of motion of an object of interest, such as a person, an animal, or a vehicle. An object of interest often moves across a camera scene, and thus has a higher score than an object of non-interest. A false motion event can be a detection of motion of an object of non-interest, such as a tree branch, a flag, a hanging flower pot, or a yard sign. Objects of non-interest often flutter around over the same region of a camera scene, and thus tend to have lower traversal scores than objects of interest.

To compute a traversal score for a detected motion event, the event evaluator 210 can first determine a centroid location of an object in each frame of a frame set. The frame set can include multiple sequential image frames in which the object was detected during the motion event. The frame set includes a number of frames represented by "N." The event evaluator 210 can determine the centroid location of the object in each of the N frames in which the moving object was detected. An example object is the person 114 walking on the walkway 116. As the person 114 walks along the walkway 116, the person 114 is detected in the camera scene for a duration of a number of seconds, e.g., five seconds. For an example camera with a frame rate of thirty frames per second (fps), a person being detected for five seconds will be detected in approximately one hundred fifty frames. In this example, the number of frames N in which the object was detected is one hundred fifty.

The centroid of the object can be the center of a bounding box around the object in an image frame. The centroid can identified by two-dimensional x-y coordinate of a pixel corresponding to the center of the bounding box. The centroid of the object in frames 1 to N can be represented by $c_1, c_2, c_3, \ldots, c_N$. The event evaluator can determine the distance between centroid coordinates for the object in subsequent frames. For example, $d(c_2,c_1)$ can correspond to the Euclidean distance between the two-dimensional coordinate $c_1$, representing the centroid in frame 1, and two-dimensional coordinate $c_2$, representing the centroid in frame 2. Similarly, $d(c_4,c_1)$ represents the distance between coordinate $c_1$, representing the centroid in frame 1, and coordinate $c_4$, representing the centroid in frame 4. Thus, $d(c_4,c_1)$ represents the distance between the centroid location in a first frame of a set of N frames, and the centroid location in a final frame of the set of N frames.

The event evaluator 210 can use the distance to determine a traversal metric (TM) at intervals of the event. For example, the traversal metric can be calculated for intervals of four consecutive frames over the course of an event of one hundred sixty frames. Thus, in one hundred sixty frames, using a traversal metric calculated for every four frames, forty traversal metrics will be calculated. A traversal metric can be computed using Equation 1.

$$TM(c_4,c_1) = d(c_4,c_1)/(d(c_1,c_2)+d(c_2,c_3)+d(c_4,c_3)) \quad \text{Equation 1}$$

In Equation 1, the traversal metric is calculated for four frames. In some examples, other intervals can be used. For example, a traversal metric may be calculate for intervals of six frames, eight frames, or ten frames.

Using Equation 1, a traversal metric close to a value of 1.0 represents strong traversal, e.g., motion of the object across the scene. Thus, a traversal metric value closer to 1.0 is more likely to represent motion of an object of interest than a traversal metric value further away from 1.0. With other processes, other traversal metric values can represent strong traversal. As an example, the person 114 walking on the walkway from right to left in the camera scene will have a traversal metric closer to 1.0, e.g., a traversal metric of 0.7, 0.8, or 0.9. In contrast, a flag fluttering in the wind while remaining in place will have a traversal metric further away from 1.0, e.g., a traversal metric of 0.2, 0.3, or 0.4.

The event evaluator 210 can determine a net traversal score based on the traversal metrics. For example, the event evaluator 210 can combine traversal metrics for multiple frame sets, where each frame set includes multiple sequential image frames in which the object was detected during the motion event. An example equation for determining a net traversal score is shown in Equation 2.

$$\text{Net Traversal Score} = TM(c_4, c_1) + TM(c_5, c_2) + \ldots + TM(c_N, c_{N-3}) \qquad \text{Equation 2}$$

The event evaluator 210 can determine, for each motion event 132, whether the net traversal score meets criteria for a true motion event. If the net traversal score for a motion event 132 meets criteria for a true motion event, then the motion event 132 is classified as a true motion event. The criteria for a true motion event can be, for example, a minimum threshold net traversal score. A motion event 132 that does not meet criteria for a true motion event is classified as a false motion event.

The event evaluator 210 generates a motion event map 212. The motion event map 212 is a map of false motion events and true motion events. As depicted in the example of FIG. 2, the motion event map 212 includes solid bounding boxes 214 showing locations of detected true motion events, and dashed bounding boxes 216 showing locations of detected false motion events.

The motion mapper 220 generates a false motion map 222 and a true motion map 224. The false motion map 222 includes an outline 223 encompassing pixels that correspond to locations of the scene where false motion event detections occurred, as shown in the motion event map 212. The true motion map 224 includes an outline 225 encompassing pixels that correspond to locations of the scene where true motion events occurred, as shown in the motion event map 212.

The true motion map 224 includes an outline of locations of the true motion events that have higher traversal scores compared to the false motion events, e.g., net traversal scores above a threshold net traversal score. The true motion map 224 can be generated based on trajectories of the bounding boxes for true objects of interest.

In some examples, the true motion map 224 can be generated based on locations of lower portions of the bounding boxes shown in the motion event map 212. Most real objects of interest, such as people and vehicles, travel along the ground. Therefore, the lower portions, or "foot locations," of the bounding boxes can be assumed to represent the actual location of the object of interest. The lower portion of a bounding box can be a portion of the bounding box that includes the lower boundary of the bounding box. For example, the outline 225 of the true motion map 224 can be generated to encompass the bottom portions of the solid bounding boxes 214. The bottom portions can be, for example, the bottom ⅓, ¼, or ⅕ of the bounding boxes.

The lower portions of the bounding boxes for true motion events can be assimilated across a period of time. The true motion map 224 can represent a number of true motion events that have occurred over a period of time. The period of time can be, for example, a number of hours, days, or weeks. The number of true motion events can be, for example, fifty true motion events, seventy true motion events, or a hundred true motion events that have occurred in the camera scene over the period of time. Thus, the true motion map 224 represents a motion-footprint for the scene using the trajectories that were taken by the respective true objects.

The false motion map 222 includes an outline of locations of false motion events that have lower traversal scores compared to the true motion events, e.g., net traversal scores below a threshold net traversal score. The false motion map 222 can be generated based on the dashed bounding boxes 216 for the objects of non-interest. The false motion map 222 can be generated based on entire bounding boxes, e.g., without excluding the top portions of the bounding boxes. Some objects of non-interest, e.g., flags, may be elevated off of the ground. Therefore, the outline 223 of the false motion map 222 should encompass the entirety or majority of each bounding box 216, instead of only the lower portions of the bounding boxes.

The bounding boxes for false motion events are assimilated across a period of time. The false motion map 222 can represent a number of false motion events that have occurred over a period of time. The period of time can be, for example, a number of hours, days, or weeks. The number of false motion events can be, for example, fifty false motion events, seventy false motion events, or a hundred false motion events that have occurred in the camera scene over the period of time. Thus, the false motion map 222 represents a motion map for the scene using the locations of movement of the objects of non-interest.

In the example of FIG. 2, the false motion map 222 shows locations of vegetation that has caused false motion detections. Other examples of false motion can include outdoor furniture, such as a patio set with an umbrella that moves in the wind. In some examples, holiday or seasonal decorations installed after setting the initial AOI can also cause false motion events and spurious alerts.

The AOI evaluator 230 receives the initial AOI 120 and the false motion map 222. The AOI evaluator 230 determines a false motion overlap area with the AOI 232. For example, the AOI evaluator can compute the intersection between the initial AOI 120 and the pixels within the outline 223 of the false motion map 222. The pixels that overlap between the initial AOI 120 and the false motion map 222 can be further qualified using a scene-segmentation or scene-labeler algorithm.

The scene labeler 240 can label the scene using, for example, a pretrained scene segmentation approach. Using the scene segmentation algorithm, a server can classify each pixel of the camera images. For example, the scene labeler 240 can classify each pixel of the scene as showing a component of the road 112, the walkway 116, the yard 118, etc. In some examples, the scene labeler 240 can assimilate scene labels for each pixel from different camera images and can fuse the scene labels into a single fused scene-segmentation output.

The fused segmentation output can include multiple scene labels, e.g., building, sky, trees, plants, pillar, railings, ground, earth, road, sidewalk, driveway, and porch. The labels can be categorized as "likely of interest" labels and "likely not of interest" labels. For example, the scene labeler 240 may classify a road, sidewalk, driveway, walkway, and porch as areas that are likely of interest. The scene labeler 240 may classify a building, sky, trees, plants, pillar, and railings as likely not of interest.

The scene labeler 240 outputs labeled scene 242. The AOI trimmer 250 performs AOI adjustments based on the overlap area between the initial AOI 120 and the false motion map 222, and based on the labeled scene 242. For an example pixel, or pixel group, that is included in the false motion map 222, overlaps with the AOI, and is labeled as a flag, tree, plant, bush, sky, ceiling, or unknown object that corresponds to a category of "likely not of interest," the AOI trimmer 250 can remove the pixel, or the pixel group, from the AOI. Once the pixel or pixel group is removed from the AOI, the object detector can ignore motion detected at that pixel location. For an example pixel that is included in the false motion map 222, overlaps with the AOI, and is labeled as a walkway, porch, or road, the AOI trimmer 250 can determine to maintain the pixel in the AOI.

In some examples, the determination to remove a pixel from the AOI can be based in part on confidence values. For example, the scene labeler 240 may output a confidence value of each label. If the label is "walkway," and the confidence value is high, the AOI trimmer 250 may determine to keep the pixel in the AOI. However, if the label is "walkway," and the confidence value is low, the AOI trimmer 250 may determine to remove the pixel from the AOI.

In the example of FIG. 2, the pixels within the outline 223 of the false motion map 222 are labeled "plant." The AOI trimmer 250 can determine to remove the pixels from the initial AOI based on the pixels of the false motion map 222 overlapping with the initial AOI 120 and being labeled "plant."

The AOI trimmer 250 outputs a trimmed AOI 252. The trimmed AOI 252 is an adjusted version of a copy of the initial AOI 120. The trimmed AOI 252 may have one or more pixels removed compared to the initial AOI 120. The trimmed AOI 252 can be identified by the AOI trimmer 250 as a recommended replacement for the initial AOI 120.

The AOI verifier 260 verifies the trimmed AOI 252 by checking if the recommended trimmed AOI 252 satisfies performance criteria. Performance criteria can include a number of metrics. Example metrics can include recall metrics, true motion overlap metrics, and latency metrics. In some examples, the AOI verifier 260 can verify the trimmed AOI 252 by determining an impact of using the trimmed AOI 252 on at least one of the recall of the camera, the detection latency of the camera, or a degree of overlap between the respective area of the interest and the map of true motion event detections.

Recall metrics can be based on criteria for impacts of the trimmed AOI on recall of the event detector 130. Recall criteria can include, for example, a maximum threshold quantitative impact on the camera's recall for true motion events. In some cases, recall can be determined based on a ratio of the number of true positive detections to the total number of true objects of interest depicted in images captured by the camera during a duration of time. In some cases, recall can be determined based on a ratio of the number of true positive detections to the combined number of true positive detections and false negative detections that occurred during a duration of time.

In an example of determining recall impacts, the event detector 130 may detect thirty true positive detections in a scene during a time period, using the initial AOI 120. The ground truth total number of true objects of interest in the scene may be forty objects of interest during the time period. Thus, the recall in this example is seventy-five percent using the initial AOI 120. For the same duration of time, the event detector 130 may be predicted to detect twenty-eight positive detections in the scene using the trimmed AOI 252. Thus, the recall would be seventy percent using the trimmed AOI. In this example, the impact of the trimmed AOI 252 on recall of the event detector 130 is a decrease of five percent.

The AOI verifier 260 can quantify predicted recall impacts that the recommended changes would have on the event detector 130. To predict impacts on the camera's performance, the camera can use an offline process where previously reported events are tested with the trimmed AOI 150. For example, the camera can select a number of events, e.g., one hundred events that have previously occurred. The events can be selected across different times of day and different weeks, months, and seasons. The AOI verifier 260 can simulate event detection by testing the selected events using the trimmed AOI 252. If the camera 110 does not detect a drop in recall performance, then the AOI verifier 260 can verify the trimmed AOI 252 by determining that the trimmed AOI 252 can be used for detecting events. If the AOI verifier 260 does detect a drop in performance because of the recommended changes, then the AOI verifier 260 might fail to verify the trimmed AOI 252 by determining that the trimmed AOI 252 should not be used for detecting events.

In some examples, the AOI verifier 260 can compare predicted recall impacts to a threshold recall impact. For example, a maximum threshold recall impact may be ten percent. In the example above, the recall impact of the trimmed AOI 252 was five percent. Therefore, the trimmed AOI 252 satisfies the recall impact criteria due to the recall impact of five percent being less than, or less than or equal to, the threshold recall impact of ten percent.

True motion overlap metrics can be based on a comparison between a true motion map and the trimmed AOI 252. In some implementations, to determine effectiveness of the trimmed AOI 252, the AOI verifier 260 compares a true motion overlap score of the trimmed AOI 252 to a true motion overlap score of the initial AOI 120. For example, the AOI verifier 260 can determine a first overlap score that represents the degree of overlap between the true motion map 224 and the initial AOI 120. The first overlap score can be measured, e.g., as a number of pixels in common between the true motion map 224 and the initial AOI 120. The AOI verifier 260 determines a second overlap score that represents the degree of overlap between the true motion map 224 and the trimmed AOI 252.

The AOI verifier 260 can compare the first overlap score to the second overlap score. The AOI verifier 260 can determine whether the difference between the first overlap score and the second overlap score satisfies similarity criteria, e.g., by comparing the difference to a maximum threshold impact or maximum threshold difference. If the difference between the first overlap score and the second overlap score satisfies, e.g., is less than or less than or equal to, the maximum threshold impact, the AOI verifier 260 can verify the trimmed AOI 252 by determining that the trimmed AOI 252 can be used for detecting events. If the difference between the first overlap score and the second overlap score does not satisfy, e.g., is greater than or greater than or equal to, the maximum threshold impact, the trimmed AOI 252 might fail to verify the trimmed AOI 252 by determining that the trimmed AOI 252 should not be used for detecting events.

Latency metrics can be based on a comparison in detection latency between the initial AOI and the trimmed AOI 252. Detection latency can be defined as a time delay between the time when an event occurs and the time when the camera detects the event.

In some implementations, the AOI verifier 260 can compare detection latency for the initial AOI 120 to detection latency for the trimmed AOI 252 using an offline process where previously reported events are tested with the trimmed AOI 150. For example, the camera can select a number of events, e.g., one hundred events that have previously occurred. The events can be selected across different times of day and different weeks, months, and seasons. In some implementations, the previously reported events can include ground truth data. For example, ground truth data can include an actual time when an event occurred, as labeled by a user.

The AOI verifier 260 can simulate event detection by testing the selected events using the trimmed AOI 252. If the camera 110 does not detect a change in reaction time, or detection latency, to the event compared to detection that occurred using the initial AOI 120, then the AOI verifier 260 can approve the trimmed AOI 252. If the AOI verifier 260 does detect a decrease in performance because of the recommended changes, then the AOI verifier 260 might not approve the trimmed AOI 252.

In an example, a user may define an initial AOI that includes a driveway. When the camera detects a vehicle entering the driveway, the camera can be configured to perform an action such as transmitting an instruction to a garage door opener to open a garage door. Using an initial AOI, the ground truth start of an event may occur when a vehicle enters the driveway in a first image frame, and the camera may detect the vehicle in the initial AOI a tenth image frame. Thus, the AOI verifier 160 can determine a first detection latency of nine image frames between ground truth and detection, using the initial AOI.

Using a trimmed AOI, the ground truth start of the event may occur when the vehicle enters the driveway in a first image frame, and the camera may detect the vehicle in the trimmed AOI in a fiftieth image frame. Thus, the AOI verifier 160 can determine a second detection latency of forty-nine image frames between ground truth and detection, using the trimmed AOI.

The AOI verifier 260 can compare the first detection latency to the second detection latency. If the difference between the first detection latency and the second detection latency satisfies similarity criteria, the trimmed AOI 252 can verified. If the difference between the first detection latency and the second detection latency does not satisfy similarity criteria, the trimmed AOI 252 might not be verified. The similarity criteria can include, for example, a threshold difference between the first detection latency and the second detection latency. If the difference is less than the threshold difference, the trimmed AOI 252 satisfies similarity criteria.

In some implementations, latency can be determined based on a time when an action occurs or is predicted to occur. For example, when the camera detects the vehicle in the tenth image frame using the initial AOI, the camera may transmit the instruction to the garage door causing the garage door to start to open, e.g., at the time of a sixtieth image frame. In contrast, upon detecting the vehicle in the trimmed AOI in the fiftieth image frame, the camera may be predicted to transmit the instruction to the garage door causing the garage door to start to open, e.g., at the time of a hundredth image frame. Thus, using the trimmed AOI is predicted to cause a delay of forty image frames in the garage door starting to open. For a frame rate of thirty frames per second, this corresponds to a delay of approximately one second. Thus, using the trimmed AOI in place of the initial AOI is predicted to cause approximately a one second increase in latency in opening the garage door. The AOI verifier 260 can compare the latency in opening the garage door to latency criteria, e.g., a maximum threshold impact to detection latency. The maximum threshold impact to detection latency can be, for example, a maximum threshold increase in latency. If the predicted increase in latency in opening the garage door is greater than the maximum threshold increase in latency, the AOI verifier 260 might not approve the trimmed AOI.

In some implementations, the AOI verifier 160 can verify the trimmed AOI 252 using any combination of metrics for recall, overlap scores, and detection latencies. In some examples, the AOI verifier 160 can verify the trimmed AOI 252 by determining that the trimmed AOI 252 satisfies criteria for one out of three metrics, two out of three metrics, or all three metrics. Similarly, the AOI verifier 160 might not approve the trimmed AOI 252 based on the trimmed AOI 252 failing to satisfy criteria for at least one metric, for at least two metrics, or for all three metrics.

The AOI verifier 160 can verify the trimmed AOI 252 by evaluating metrics of the trimmed AOI 252 over a period of time. The period of time can be, for example, a programmed number of hours or days. In some examples, the AOI verifier 160 can verify the trimmed AOI 252 by evaluating metrics of the trimmed AOI 252 for a duration of time during which a particular number of detections occur. For example, the AOI verifier 160 can evaluate metrics of the trimmed AOI 252 for a duration of time during which at least ten detections occur, at least twenty detections occur, at least thirty detections occur, etc.

If the trimmed AOI 252 is verified, the AOI adjuster 140 outputs the verified, adjusted AOI 150. The AOI adjuster 140 replaces the initial AOI 120 with the adjusted AOI 150. The event detector 130 then uses the adjusted AOI 150 to detect events in images captured by the camera 110. In some examples, the event detector 130 uses the adjusted AOI 150 to detect events in images captured by the camera 110 instead of using the initial AOI 120.

When the adjusted AOI 150 replaces the initial AOI, the camera 110 can generate a notification for the user to notify the user of the replaced AOI. The camera 110 can transmit the notification, e.g., to a mobile device of the user to notify the user that the AOI has been adjusted.

In some implementations, the user can provide feedback to the camera 110, e.g., through a mobile application on a mobile device. For example, the user may provide feedback indicating that the garage door is slow to open when a vehicle enters the driveway. In another example, the user may provide feedback indicating that the user is receiving too many false alerts. Upon receiving the user feedback, the camera 110 can initiate the AOI adjustment process in order to adjust and refine the AOI. The AOI adjustment process can include increasing a size of the AOI. The camera 110 can increase the size using a similar process as that described to decrease the size of the AOI but with a correction motion map instead of the false motion map 222. The correction motion map can indicate one or more areas, e.g., represented by one or more outlines, that the camera 110 is analyzing for adding to the AOI.

In some implementations, after replacing the initial AOI 120 with the adjusted AOI 150, the camera 110 can determine to roll back the AOI to the initial AOI 120. For example, the event evaluator 210 may detect a decrease in performance of the event detector 130, e.g., as evidenced by false positive detections and/or false negative detections. In some examples, detecting a decrease in performance includes determining that an average rate of false motion event detections that occur while detecting events using the adjusted AOI 252 is greater than, or substantially the same as, or either, an average rate of false motion event detections that occur while detecting events using the initial AOI 120. In response to detecting the decrease in performance using the adjusted AOI 150, the AOI adjuster 140 can determine to roll back to using the initial AOI 120. Thus, in response to detecting the decrease in performance of the camera, the camera 110 can detect events in the initial AOI 120 instead of the adjusted AOI 150. In some implementations, the AOI adjuster 140 may determine to roll back to using the initial AOI 120 until additional event evaluations can be performed in order to generate a new adjusted AOI.

In some implementations, if the AOI verifier 260 does not approve the trimmed AOI 252, the AOI adjuster 140 alerts a master system that a model update may be necessary for the camera 110 in order to achieve improved performance. The master system can be, for example, a monitoring server of a monitoring system of which the camera 110 is a component. In this way, the AOI adjuster 140 can assist the master system with identifying a case where a model update is needed.

In response to detecting a motion event, the monitoring system can perform one or more actions. For example, the camera 110 can send an alert to a user such as a resident. In some examples, the camera 110 may send the alert to a mobile device associated with the resident. In some examples, the camera 110 may send the alert via a mobile application or text message. The alert can include a message stating that a person is approaching the property.

In some examples, in addition to sending the alert to the resident, the system 100 may perform one or more actions in response to detecting the motion event. For example, the system may activate one or more additional sensors, e.g., motion sensors, additional cameras, microphones, etc. In some examples, the system may perform automatic actions such as turning on a porch light or ringing a doorbell.

In some implementations, in response to detecting false motion events in an AOI, the AOI adjuster 140 can perform one or more functions instead of or in addition to trimming the initial AOI. If the true motion map and false motion map are largely disjoint, such that there is little or no overlap, then the AOI adjuster 140 can remove the region indicated by the false motion map from the initial AOI. However, if the false motion map overlaps with the true motion map, then removing the false motion map from the AOI may impede the detection of true motion events. In such instances, the camera can avoid adjusting the AOI and can instead introduce additional checks and verifications to differentiate true motion events from false motion events. In these implementations, additional computations are added in order to reduce reporting of false positive detections.

In an example of an additional verification, if a bounding box identified as part of an event by the object detector falls inside the false motion map or if the bounding box overlaps by greater than a threshold percentage with the false motion map, then the event detected by the event detector can be classified as false and the event is not reported to the user. The threshold percentage can be, for example, fifty percent.

In another example of an additional verification, if a bounding box identified as part of an event by the event detector falls inside the false motion map and has instances when the bounding box overlaps with the true motion map by more than a threshold percentage, then the event detected can be classified as true and is reported the user. The threshold percentage can be, for example, fifty percent.

In another example of an additional verification, if a bounding box identified as part of an event by the event detector has no overlap with the false motion map, and overlaps only with the true motion map, then the event can be classified as a true motion event and is reported to the user.

Figure 3:
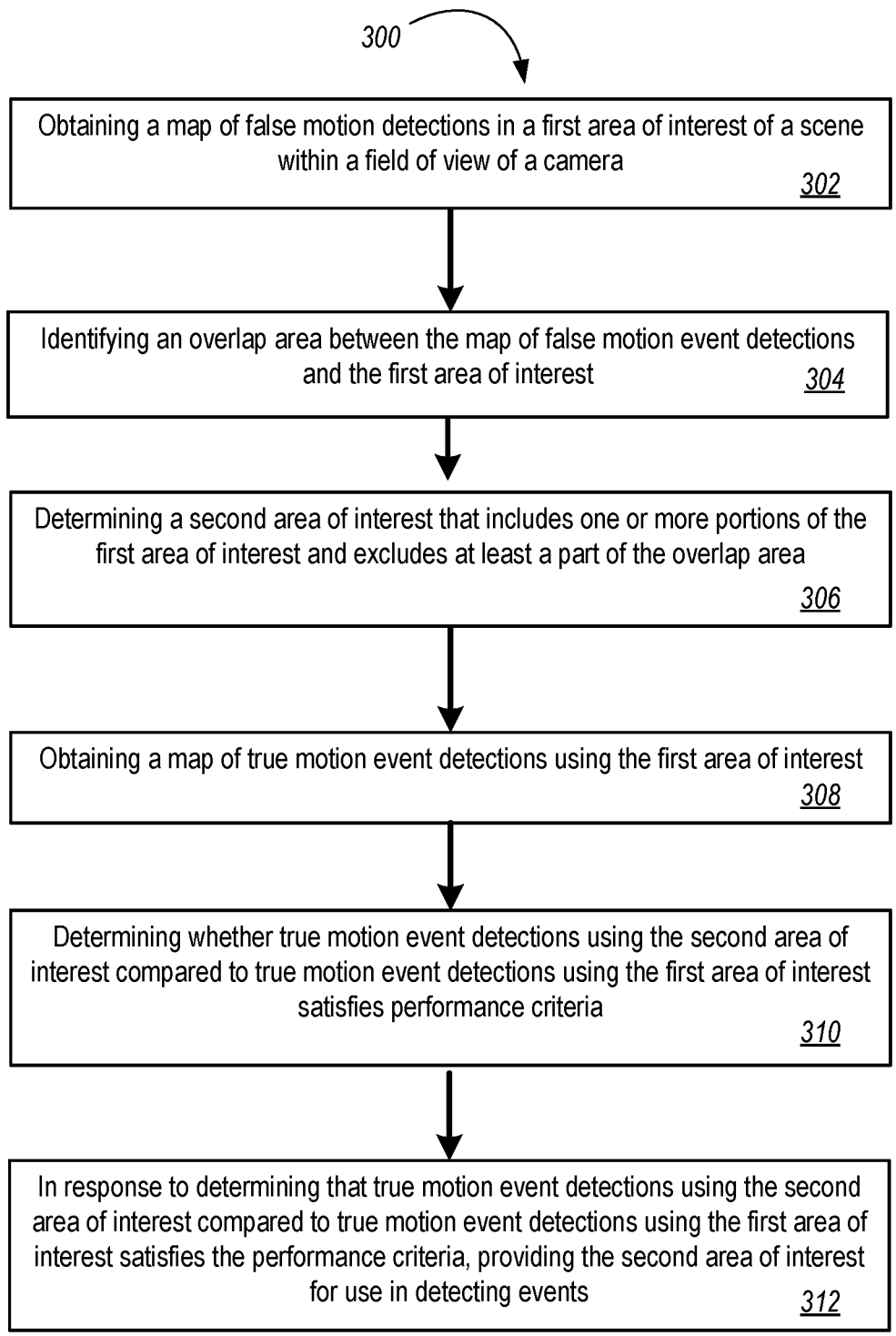
FIG. 3 is a flow chart illustrating an example of a process for adjusting areas of interest for motion detection in camera scenes.

FIG. 3 is a flow chart illustrating an example of a process 300 for adjusting areas of interest for motion detection in camera scenes. The process 300 can be performed by a camera, e.g. the camera 110. In some implementations, the process 300 can be performed by one or more computer systems that communicate electronically with a camera, e.g., a server.

Briefly, process 300 includes obtaining a map of false motion event detections using a first area of interest of a scene within a field of view of a camera (302), identifying an overlap area between the map of false motion event detections and the first area of interest (304), determining a second area of interest that includes one or more portions of the first area of interest and excludes at least a part of the overlap area between the map of false motion event detections and the first area of interest (306), obtaining a map of true motion event detections using the first area of interest (308), determining whether true motion event detections using the second area of interest compared to true motion event detections using the first area of interest satisfies performance criteria (310), and in response to determining that true motion event detections using the second area of interest compared to true motion event detections using the first area of interest satisfies the performance criteria, providing the second area of interest for use in detecting events (312).

In additional detail, the process 300 includes obtaining a map of false motion event detections using a first area of interest of a scene within a field of view of a camera (302). For example, the motion mapper 220 may generate, from the motion event map 212, a map of false motion detections in the initial AOI 120. The first area of interest of the scene can be, for example, a user-input selection of a region of the scene. The map of false motion detections can be, for example, the false motion map 222.

The process 300 includes identifying an overlap area between the map of false motion event detections and the first area of interest (304). For example, the AOI evaluator 230 can identify pixels that are in common between the false motion map 222 and the initial AOI 120.

The process 300 includes determining a second area of interest that includes one or more portions of the first area of interest and excludes at least a part of the overlap area between the map of false motion event detections and the first area of interest (306). For example, the AOI trimmer 250 can determine a trimmed AOI 252 based on the overlap between the false motion map 222 and the initial AOI 120. In some examples, the trimmed AOI 252 can be generated by removing, from a copy of the initial AOI 120, at least some of the pixels that are in common between the false motion map 222 and the initial AOI 120. Thus, the trimmed AOI 252 includes one or more portions of the initial AOI 120 and excludes at least a part of the overlap area between the false motion map 222 and the initial AOI 120. In some examples, the trimmed AOI 252 can be generated by removing, from a copy of the initial AOI 120, a region of the scene corresponding to the overlap area.

The process 300 includes obtaining a map of true motion event detections using the first area of interest (308). For example, the motion mapper 220 may generate, from the motion event map 212, a true motion map 224.

The process 300 includes determining whether true motion event detections using the second area of interest compared to true motion event detections using the first area of interest satisfies performance criteria (310). For example, the AOI verifier 260 can determine whether true motion events in the trimmed AOI 252 are predicted to satisfy the recall criteria. The recall criteria can include criteria for similarity between recall of the event detector 130 using the initial AOI 120 and predicted recall of the event detector 130 using the trimmed AOI 252.

The process 300 includes, in response to determining that true motion event detections using the second area of interest compared to true motion event detections using the first area of interest satisfies the performance criteria, providing the second area of interest for use in detecting events (312). For example, the AOI verifier may determine that detection of true motion events in the trimmed AOI 252 satisfy the recall criteria. Based on determining that detections in the trimmed AOI 252 are predicted to satisfy the recall criteria, the AOI adjuster 140 can replace the initial AOI 120 with the verified adjusted AOI 150. The event detector 130 can then detect events in the adjusted AOI 150. In some examples, providing the second area of interest for use in detecting events includes storing the second area of interest in memory and detecting events using the stored second area of interest. For example, a server can store the adjusted AOI 150 and provide, to the camera 110, the adjusted AOI 150 for use in detecting events.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
providing, for use in detecting events depicted in one or more first images, a first area of interest of a scene within a field of view of a camera;
obtaining a map of false motion events that were detected using the first area of interest;
in response to obtaining the map of false motion events, identifying an overlap area between the map of false motion events and the first area of interest;
determining a second area of interest that includes one or more portions of the first area of interest and excludes at least a part of the overlap area between the map of false motion events and the first area of interest;
obtaining a map of true motion events that were detected using the first area of interest;
determining, using the map of true motion events, a performance metric for using the first area of interest to detect events;
determining, using the map of true motion events, a predicted performance metric for using the second area of interest to detect events;
determining whether the performance metric for using the first area of interest to detect events and the predicted performance metric for using the second area of interest to detect events satisfy performance criteria; and
in response to determining that the performance metric for using the first area of interest to detect events and the predicted performance metric for using the second area of interest to detect events satisfy the performance criteria, providing the second area of interest for use in detecting events depicted in one or more different, second images instead of the first area of interest.

2. The method of claim 1, comprising generating the map of false motion events and the map of true motion events by:
obtaining data defining the first area of interest;
obtaining the one or more first images;
detecting a plurality of motion events in the one or more first images, each motion event representing motion of an object within the field of view of the camera; and
classifying each motion event as a false motion event or a true motion event.

3. The method of claim 2, comprising:
determining a traversal score for each motion event, wherein the traversal score indicates an extent of motion of the object across the field of view of the camera,
wherein classifying each motion event as a true motion event or a false motion event uses the traversal score.

4. The method of claim 3, wherein determining a traversal score comprises, for each motion event representing motion of an object:
determining a centroid location of the object in each frame of a frame set, the frame set including multiple sequential image frames in which the object was detected during the motion event;
determining a traversal metric using a distance between the centroid location in a first frame of the frame set and the centroid location in a final frame of the frame set; and
determining, for each motion event, a corresponding traversal score by combining traversal metrics for a plurality of frame sets, each frame set including multiple sequential image frames in which the object was detected during the motion event.

5. The method of claim 1, wherein the map of false motion events includes an outline encompassing pixels that correspond to locations of the scene where false motion events occurred.

6. The method of claim 1, wherein the map of true motion events includes an outline encompassing pixels that correspond to locations of the scene where true motion events occurred, the method comprising generating the map of true motion events by:

generating a plurality of bounding boxes, wherein each bounding box includes at least an upper boundary and a lower boundary and encloses a location of the scene where a true motion event occurred; and generating the outline, wherein the outline encompasses a portion of each bounding box that includes the lower boundary of the bounding box.

7. The method of claim 1, wherein determining the second area of interest comprises:

labeling segments of the scene according to objects represented by the segments;

generating a copy of the first area of interest; and adjusting the copy of the first area of interest based on the labels of the segments of the scene to obtain the second area of interest.

8. The method of claim 7, wherein adjusting the copy of the first area of interest based on the labels of the segments of the scene comprises:

determining a label for a particular segment of the scene within the overlap area between the map of false motion events and the first area of interest;

classifying the label of the particular segment as corresponding to an object that is not of interest; and based on classifying the label of the particular segment as corresponding to an object that is not of interest, removing the particular segment from the copy of the first area of interest.

9. The method of claim 7, wherein adjusting the copy of the first area of interest using the labels of the segments of the scene comprises:

determining a label for a particular segment of the scene within the overlap area between the map of false motion events and the first area of interest;

classifying the label of the particular segment as corresponding to an object that is of interest; and based on classifying the label of the particular segment as corresponding to an object that is of interest, maintaining the particular segment within the first area of interest.

10. The method of claim 1, wherein determining whether the performance metric for using the first area of interest to detect events and the predicted performance metric for using the second area of interest to detect events satisfy performance criteria comprises determining an impact of using the second area of interest on at least one of:

a recall of the camera;

a detection latency of the camera; or a degree of overlap between the respective area of interest and the map of true motion events.

11. The method of claim 1, wherein the performance criteria comprise a maximum threshold impact on a recall of the camera, the recall of the camera using a ratio of a number of true motion events to a total number of true objects of interest depicted in images captured by the camera during a duration of time.

12. The method of claim 1, wherein the performance criteria comprise a maximum threshold impact on a true motion overlap score of the camera, the true motion overlap score using a degree of overlap between a map of true motion events and a respective area of interest.

13. The method of claim 1, wherein the performance criteria comprise a maximum threshold impact on detection latency of the camera, the detection latency using a time delay between a time when an event occurs and a time when the camera detects the event.

14. The method of claim 1 comprising:

detecting a decrease in performance of the camera while detecting events using the second area of interest; and in response to detecting the decrease in performance of the camera, providing the first area of interest for use in detecting events.

15. The method of claim 14, wherein detecting the decrease in performance comprises determining that an average rate of false motion events that occur while detecting events using the second area of interest is greater than an average rate of false motion events that occur while detecting events using the first area of interest.

16. A system comprising one or more computers and one or more computer storage media storing instructions that are operable, when executed by the one or more computers, to cause the one or more computers to perform operations comprising:

providing, for use in detecting events depicted in one or more first images, a first area of interest of a camera;

obtaining a map of false motion events that were detected using the first area of interest;

in response to obtaining the map of false motion events, identifying an overlap area between the map of false motion events and the first area of interest;

determining a second area of interest that includes one or more portions of the first area of interest and excludes at least a part of the overlap area between the map of false motion events and the first area of interest;

obtaining a map of true motion events that were detected using the first area of interest;

determining, using the map of true motion events, a performance metric for using the first area of interest to detect events;

determining, using the map of true motion events, a predicted performance metric for using the second area of interest to detect events;

determining whether the performance metric for using the first area of interest to detect events and the predicted performance metric for using the second area of interest to detect events satisfy performance criteria; and in response to determining that the performance metric for using the first area of interest to detect events and the predicted performance metric for using the second area of interest to detect events satisfy the performance criteria, providing the second area of interest for use in detecting events depicted in one or more different, second images instead of the first area of interest.

17. A non-transitory computer-readable medium storing software comprising instructions executable by one or more computers which, upon such execution, cause the one or more computers to perform operations comprising:

providing, for use in detecting events depicting in one or more first images, a first area of interest of a camera;

obtaining a map of false motion events that were detected using the first area of interest;

in response to obtaining the map of false motion events, identifying an overlap area between the map of false motion events and the first area of interest;

determining a second area of interest that includes one or more portions of the first area of interest and excludes at least a part of the overlap area between the map of false motion events and the first area of interest;

obtaining a map of true motion events that were detected using the first area of interest;

determining, using the map of true motion events, a performance metric for using the first area of interest to detect events;

determining, using the map of true motion events, a predicted performance metric for using the second area of interest to detect events;

determining whether the performance metric for using the first area of interest to detect events and the predicted performance metric for using the second area of interest to detect events satisfy performance criteria; and in response to determining that the performance metric for using the first area of interest to detect events and the predicted performance metric for using the second area of interest to detect events satisfy the performance criteria, providing the second area of interest for use in detecting events depicted in one or more different, second images instead of the first area of interest.

18. The method of claim 1, wherein determining whether the performance metric for using the first area of interest to detect events and the predicted performance metric for using the second area of interest to detect events satisfy performance criteria comprises:

determining that the performance metric for using the first area of interest to detect events and the predicted performance metric for using the second area of interest to detect events satisfy the performance criteria.

19. The method of claim 1, wherein determining whether the performance metric for using the first area of interest to detect events and the predicted performance metric for using the second area of interest to detect events satisfy performance criteria comprises:

determining that a difference between the performance metric for using the first area of interest to detect events and the predicted performance metric for using the second area of interest to detect events satisfies the performance criteria.

20. The method of claim 1, wherein the overlap area between the map of false motion events and the first area of interest comprises a plurality of pixels in common between the map of false motion events and the first area of interest.

* * * * *